Patented Mar. 19, 1929.

1,705,496

UNITED STATES PATENT OFFICE.

EMIL E. NOVOTNY, OF LOGAN, PENNSYLVANIA, AND DONALD S. KENDALL, OF LITTLE FALLS, NEW JERSEY, ASSIGNORS TO JOHN STOGDELL STOKES, OF HUNTINGDON VALLEY POST OFFICE, PENNSYLVANIA.

SYNTHETIC RESIN COMPOSITION OF THE PHENOL-FURFURAL TYPE.

No Drawing. Original application filed September 17, 1921, Serial No. 501,273. Divided and this application filed January 25, 1927. Serial No. 163,554.

This invention relates to synthetic resins and the process of making the same, and the present application is in the nature of a division of our earlier application for synthetic resin composition, filed Sept. 17, 1921, Serial No. 501.273.

This divisional application is directed particularly to the use of the furane derivative, furfuramid, as a hardening agent or accelerating agent for hastening the reaction of the resin from a fusible, soluble state to an infusible, insoluble condition.

In the practice of our invention, that is, the use of furfuramid as a hardening or accelerating agent for synthetic resins in the nature of phenolic condensation products, such as one composed of furfural and phenol, as set forth in said original application, if it be desired to hasten the reaction in forming an infusible condensation product from the fusible product, and to enable the molding of articles at a relatively low temperature, we may proceed as follows:

We first make a fusible, soluble resin by mixing 100 parts of phenol with from 15 to 100 parts of furfural, and may then subject the same to a temperature of from 420° to 450° F. in an autoclave. Any water of condensation, or excess phenol is then removed, and the fusible, soluble resin remaining is either ground into the form of a powder or dissolved in a solution of alcohol or other suitable solvent. Such resin, or resinous solution, has then added thereto, as a hardening or accelerating agent, the furfural derivative furfuramid, in the proportions of from 8% to 40% by weight of the resin.

We have found that this intermediate product, when subjected, as during the molding operation, to a relatively low degree of heat, say 250° to 350° F. for a relatively short period of time, for example, from 1 to 10 minutes, will react to assume its final infusible and insoluble state. Therefore, in practice, the use of this hardening agent, furfuramid, in connection with such phenolic resin is very desirable, particularly for quick molding. Of course, this quick reacting, fusible resin may be mixed with suitable fillers, or incorporated or impregnated in fiber board or other filling structures.

In some instances we may employ a suitable catalyst, for instance, a basic catalyst, such as potassium carbonate. As an example, we may initially mix 100 parts of phenol and 75 parts of furfural, and a suitable basic catalyst, such as 2% of potassium carbonate. The liquid-like mixture formed of these three ingredients is then placed in a suitable container or vessel, and subjected to the action of a relatively low degree of heat, say from 250° to 350° F. The vessel is preferably arranged in conjunction with a return condenser, so that the vapors may be condensed and returned to the mixture-containing vessel, thereby avoiding loss of product. After the heat has been applied for the determined length of time, the water of condensation and any excess phenol is removed in the usual manner, as by evaporation, thus leaving within the vessel or container a fusible, soluble mass of resin, the melting point of which is about 240° F. This fusible resin, when removed, may be ground into powdered form, or placed in a solution with alcohol or other solvent. To attain quick molding using a relatively low degree of heat, we add, before the molding operation, to the fusible, synthetic resinous mass, furfuramid as a hardening agent and accelerating agent, in the proportions of from 8 to 40 parts of furfuramid relative to the weight of the resin in the mass. When this hardening or accelerating agent has been so added, the molding and setting of the mass to infusibility and insolubility may be accomplished by employing heat at a temperature from 250° F. to 350° F. from a period from about 1 to 10 minutes. Therefore, when speed is required in per diem production, the employment of such hardening and accelerating agent will be found desirable.

What we claim is:

1. A synthetic resin product having a furane derivative added thereto as a hardening agent to accelerate the reaction of the resinous mass from a fusible to an infusible state.

2. A phenolic condensation product having a furane derivative added thereto as a hardening agent to accelerate reaction of the resinous mass from a fusible and soluble to an infusible and insoluble state.

3. A phenolic condensation product having a furane derivative added thereto as a hardening agent to accelerate the reaction of said resinous condensation product from a fusible and soluble to an infusible and insoluble state.

4. A phenolic condensation product having furfuramid added thereto as a hardening agent and to accelerate the reaction of said phenolic condensation product from a soluble and fusible to an insoluble and infusible state.

5. A synthetic resin formed by the reaction of phenol and furfural and having added thereto furfuramid as a hardening agent.

6. A synthetic resin product of phenol, furfural and a catalyst, and having a furane derivative added thereto as a hardening agent.

7. A synthetic resin product of phenol furfural and a basic catalyst and having furfuramid added thereto as a hardening agent.

8. The herein described method of hardening a potentially reactive, fusible, soluble, phenolic condensation product which comprises adding to such product furfuramid as a hardening and accelerating agent, and then subjecting said product to the action of heat.

9. The herein described method of hardening a potentially reactive, fusible, soluble, phenolic condensation product which comprises adding to such product a furane derivative as a hardening and accelerating agent, and then subjecting said product to the action of heat.

Signed by DONALD S. KENDALL, at New York city, in the county and State of New York, the 18th day of Jan., 1927.

DONALD S. KENDALL.

Signed by EMIL E. NOVOTNY, at Philadelphia, in the county of Philadelphia, and State of Pennsylvania, the 21st day of Jan., 1927.

EMIL E. NOVOTNY.